(12) United States Patent
Sakaguchi et al.

(10) Patent No.: US 9,568,247 B2
(45) Date of Patent: Feb. 14, 2017

(54) DIRECT REDUCED IRON MANUFACTURING SYSTEM

(71) Applicant: MITSUBISHI HEAVY INDUSTRIES, LTD., Tokyo (JP)

(72) Inventors: Masakazu Sakaguchi, Tokyo (JP); Haruaki Hirayama, Tokyo (JP); Makoto Susaki, Tokyo (JP); Kazuo Ishida, Kanagawa (JP)

(73) Assignee: MITSUBISHI HEAVY INDUSTRIES, LTD., Minato-ku, Tokyo (JP)

( * ) Notice: Subject to any disclaimer, the term of this patent is extended or adjusted under 35 U.S.C. 154(b) by 151 days.

(21) Appl. No.: 14/350,928

(22) PCT Filed: Nov. 16, 2012

(86) PCT No.: PCT/JP2012/079766
§ 371 (c)(1),
(2) Date: Apr. 10, 2014

(87) PCT Pub. No.: WO2013/073663
PCT Pub. Date: May 23, 2013

(65) Prior Publication Data
US 2014/0252699 A1    Sep. 11, 2014

(30) Foreign Application Priority Data

Nov. 17, 2011 (JP) ................................. 2011-251967

(51) Int. Cl.
*F27D 17/00* (2006.01)
*C21B 13/00* (2006.01)
(Continued)

(52) U.S. Cl.
CPC ........... *F27D 17/00* (2013.01); *B01D 53/1418* (2013.01); *B01D 53/1462* (2013.01); *B01D 53/80* (2013.01);
(Continued)

(58) Field of Classification Search
CPC ............ B01D 53/1418; B01D 53/1425; B01D 53/1462; B01D 2252/204; B01D 2256/16; B01D 2256/20; B01D 2258/025; B01D 53/80; F27D 17/00; F27D 17/004; C21B 13/0073; C21B 13/02
(Continued)

(56) References Cited

U.S. PATENT DOCUMENTS 2,547,685 A    4/1951    Brassert et al.
4,439,233 A    3/1984    Faccone
(Continued)

FOREIGN PATENT DOCUMENTS

CA    1 224 337 A    7/1987
CA    2 719 602 A1    6/2011
(Continued)

OTHER PUBLICATIONS

Written Opinion dated Feb. 19, 2013, issued in corresponding International Application No. PCT/JP2012/079766, with English translation (10 pages).
(Continued)

*Primary Examiner* — Scott Kastler
*Assistant Examiner* — Michael Aboagye
(74) *Attorney, Agent, or Firm* — Westerman, Hattori, Daniels & Adrian, LLP (57) ABSTRACT

A direct reduced iron manufacturing system includes a gas reformer for supplying steam to reform natural gas, a gas heater being a heating unit for heating a reformed gas reformed by the gas reformer to a predetermined temperature, a direct reduction furnace for reducing iron ore directly into reduced iron using a high-temperature reducing gas, an acid gas removal unit having an acid gas component absorber and a regenerator for releasing the acid gas, and a recovery gas introduction line for supplying a recovery gas
(Continued)

released from the regenerator to each of a reforming furnace of the gas reformer and a furnace of the gas heater.

8 Claims, 4 Drawing Sheets

(51) Int. Cl.
*B01D 53/14* (2006.01)
*C21B 13/02* (2006.01)
*B01D 53/80* (2006.01)

(52) U.S. Cl.
CPC ........... *C21B 13/0073* (2013.01); *C21B 13/02* (2013.01); *F27D 17/004* (2013.01); *B01D 53/1425* (2013.01); *B01D 2252/204* (2013.01); *B01D 2256/16* (2013.01); *B01D 2256/20* (2013.01); *B01D 2258/025* (2013.01); *Y02P 10/122* (2015.11); *Y02P 10/136* (2015.11); *Y02P 10/143* (2015.11)

(58) Field of Classification Search
USPC .......... 266/155, 156, 197; 75/505, 495, 496, 75/497, 488
See application file for complete search history.

(56) References Cited

U.S. PATENT DOCUMENTS

| | | | |
|---|---|---|---|
| 4,477,419 A * | 10/1984 | Pearce | B01D 53/1418 423/212 |
| 5,110,350 A | 5/1992 | Villarreal-Trevino et al. | |
| 5,858,057 A | 1/1999 | Celada-Gonzalez et al. | |
| 6,027,545 A | 2/2000 | Villarreal-Trevino | |
| 6,174,506 B1 | 1/2001 | Chakravarti et al. | |
| 8,496,730 B2 * | 7/2013 | Metius | C21B 13/02 266/156 |
| 8,940,076 B2 * | 1/2015 | Duarte-Escareno | B01D 53/228 266/156 |
| 2001/0026779 A1 | 10/2001 | Chakravarti et al. | |
| 2011/0092355 A1 | 4/2011 | Iijima et al. | |
| 2011/0125157 A1 | 5/2011 | Sharkey et al. | |
| 2011/0158891 A1 * | 6/2011 | Nagayasu | B01D 53/1418 423/437.1 |
| 2011/0247457 A1 * | 10/2011 | Knop | C21B 13/02 75/392 |
| 2014/0252699 A1 | 9/2014 | Sakaguchi et al. | |
| 2014/0252700 A1 * | 9/2014 | Sakaguchi | B01D 53/1418 266/155 |

FOREIGN PATENT DOCUMENTS

| | | |
|---|---|---|
| EA | 010000 B1 | 6/2008 |
| JP | 53-062718 A | 6/1978 |
| JP | 59-169920 A | 9/1984 |
| JP | 63-047308 A | 2/1988 |
| JP | 2001-019416 A | 1/2001 |
| JP | 2001-520310 A | 10/2001 |
| JP | 2011-104580 A | 6/2011 |
| JP | 2011-136258 A | 7/2011 |
| RU | 2069701 C1 | 11/1996 |
| WO | 99/19520 A1 | 4/1999 |
| WO | 2010/042023 A1 | 4/2010 |
| WO | 2011/012964 A2 | 2/2011 |
| WO | WO 2011012964 * | 2/2011 ............. C21B 13/02 |

OTHER PUBLICATIONS

International Search Report, dated Febuary 19, 2013, isssued in corresponding application No. PCT/JP2012/079766.
Office Action dated May 2, 2016, issued in counterpart Canadian Patent Application No. 2,856,293. (3 pages).
Office Action dated May 4, 2016, issued in Canadian Patent Application No. 2,853,420 (counterpart to U.S. Appl. No. 14/352,922). (4 pages).
Final Office Action dated Jun. 15, 2016, issued in U.S. Appl. No. 14/352,922. (18 pages).
International Search Report, dated Feb. 19, 2013, issued in International Application No. PCT/JP2012/079765 (counterpart to U.S. Appl. No. 14/352,922).
English translation of Written Opinion dated Feb. 19, 2013, issued in International Application No. PCT/JP2013/079765 (counterpart to U.S. Appl. No. 14/352,922).(10 pages).
Decision of a Grant dated Aug. 11, 2015 issued in Russian Patent Office Application No. 2014117534(counterpart to U.S. Appl. No. 14/352,922), with English translation. ( 13 pages).
Non-Final Office Action dated Feb. 17, 2016, issued in U.S. Appl. No. 14/352,922 (21 pages).
Official Decision of Grant dated Sep. 23, 2015, issued in corresponding Russian Patent Application No. 2014119934, with English translation (20 pages).
Notice of Allowance dated Sep. 27, 2016, issued in U.S. Appl. No. 14/352,922 (9 pages).

* cited by examiner

DIRECT REDUCED IRON MANUFACTURING SYSTEM

FIELD

The present invention relates to a direct reduced iron manufacturing system.

BACKGROUND

Iron ore such as fine ore and lump ore is reduced in solid phase at, for example, approximately 1000° C. by modified natural gas to obtain direct reduced iron (DRI: Direct Reduced Iron). In the direct reduction iron making method, reduction furnace flue gas is returned to the reducing gas flow to be reused. Accordingly, efficiency is increased.

Water ($H_2O$) and carbon dioxide ($CO_2$) that are produced in the reduction furnace are inert in the reduction furnace. Therefore, it is necessary to remove them when the reduction furnace flue gas is reused. The water is removed in a cooler or scrubber, and the carbon dioxide in, for example, a removal unit with an amine-based solvent or the like (Patent Literature 1).

CITATION LIST

Patent Literature

Patent Literature 1: Japanese Patent Application National Publication (Laid-Open) No. 2001-520310

SUMMARY

Technical Problem

Meanwhile, a recovery gas mainly including $CO_2$ or $H_2S$ of an acid gas, which has released in a regenerator of an acid gas removal unit, cannot be discharged as it is out of the system. Accordingly, a catalyzer for removing $H_2S$ is conventionally required. However, if $H_2S$ is treated, for example, with a catalyst and the like, the catalyst is degraded due to the long-term $H_2S$ removal. Accordingly, it is necessary to replace the catalyst as occasion demands, which invites an increase in the cost of the catalyst.

Hence, a measure that enables the removal of the harmful $H_2S$ in the recovery gas in a simple method without installing a catalyzer separately is being desired to appear.

Considering the above problem, the present invention tackles a problem providing a direct reduced iron manufacturing system that can remove the harmful $H_2S$ in the recovery gas in a system that reduces iron ore directly.

Solution to Problem

According to a first aspect of the present invention in order to solve the above-problems, there is provided a direct reduced iron manufacturing system including: a gas reformer for reforming natural gas; a heating unit for heating a reformed gas reformed by the gas reformer to a predetermined temperature at which the reformed gas is supplied to a reduction furnace to form a reducing gas; a direct reduction furnace for reducing iron ore directly into reduced iron using a high-temperature reducing gas comprising hydrogen and carbon monoxide; an acid gas removal unit including an acid gas component absorber for removing, with an acid gas absorbent, an acid gas component in a reduction furnace flue gas discharged from the direct reduction furnace, and a regenerator for releasing the acid gas; and a recovery gas introduction line for supplying a recovery gas released from the regenerator, the recovery gas comprising carbon dioxide and hydrogen sulfide, to a reforming furnace of the gas reformer and a furnace of the heating unit, or only the reforming furnace.

According to a second aspect of the present invention, there is provided a direct reduced iron manufacturing system including: a heating unit for heating coal gasification gas or coke oven gas to a predetermined temperature at which the coal gasification gas or the coke oven gas is supplied to a reduction furnace to form a reducing gas; a direct reduction furnace for reducing iron ore directly into reduced iron using a high-temperature reducing gas comprising hydrogen and carbon monoxide; an acid gas removal unit including an acid gas component absorber for removing, with an acid gas absorbent, an acid gas component in a reduction furnace flue gas discharged from the direct reduction furnace, and a regenerator for releasing the acid gas; and a recovery gas introduction line for supplying a recovery gas released from the regenerator, the recovery gas comprising carbon dioxide and hydrogen sulfide, respectively to the furnace of the heating unit.

According to a third aspect of the present invention, there is provided the direct reduced iron manufacturing system according to the first or second aspect, further including a degradation product removal unit for separating and removing a degradation product in the acid gas absorbent.

According to a fourth aspect of the present invention, there is provided the direct reduced iron manufacturing system according to the first or second aspect, further including: a bypass circuit for bypassing a part of a lean solvent to be returned from the regenerator to the absorber; and a filter interposed in the bypass circuit.

According to a fifth aspect of the present invention, there is provided the direct reduced iron manufacturing system according to the first or second aspects, further including: an introduction line for introducing the reduction furnace flue gas into the acid gas removal unit; a heat exchanger, interposed on the introduction line, for heat exchanging the reduction furnace flue gas; a bag filter provided upstream of the heat exchanger; and a scrubber provided downstream of the heat exchanger.

Advantageous Effects of Invention

According to the present invention, hydrogen sulfide ($H_2S$) in a recovery gas to be released from a regenerator is prevented from being discharged directly out of the system.

DESCRIPTION OF EMBODIMENTS

Hereinafter, the present invention will be described in detail with reference to the drawings. The present invention is not limited by the embodiment(s). Moreover, if there is a plurality of embodiments, the present invention includes their combination. Moreover, the components in the embodiments include components that can easily be assumed by those skilled in the art or substantially the same components.

First Embodiment

Figure 1:
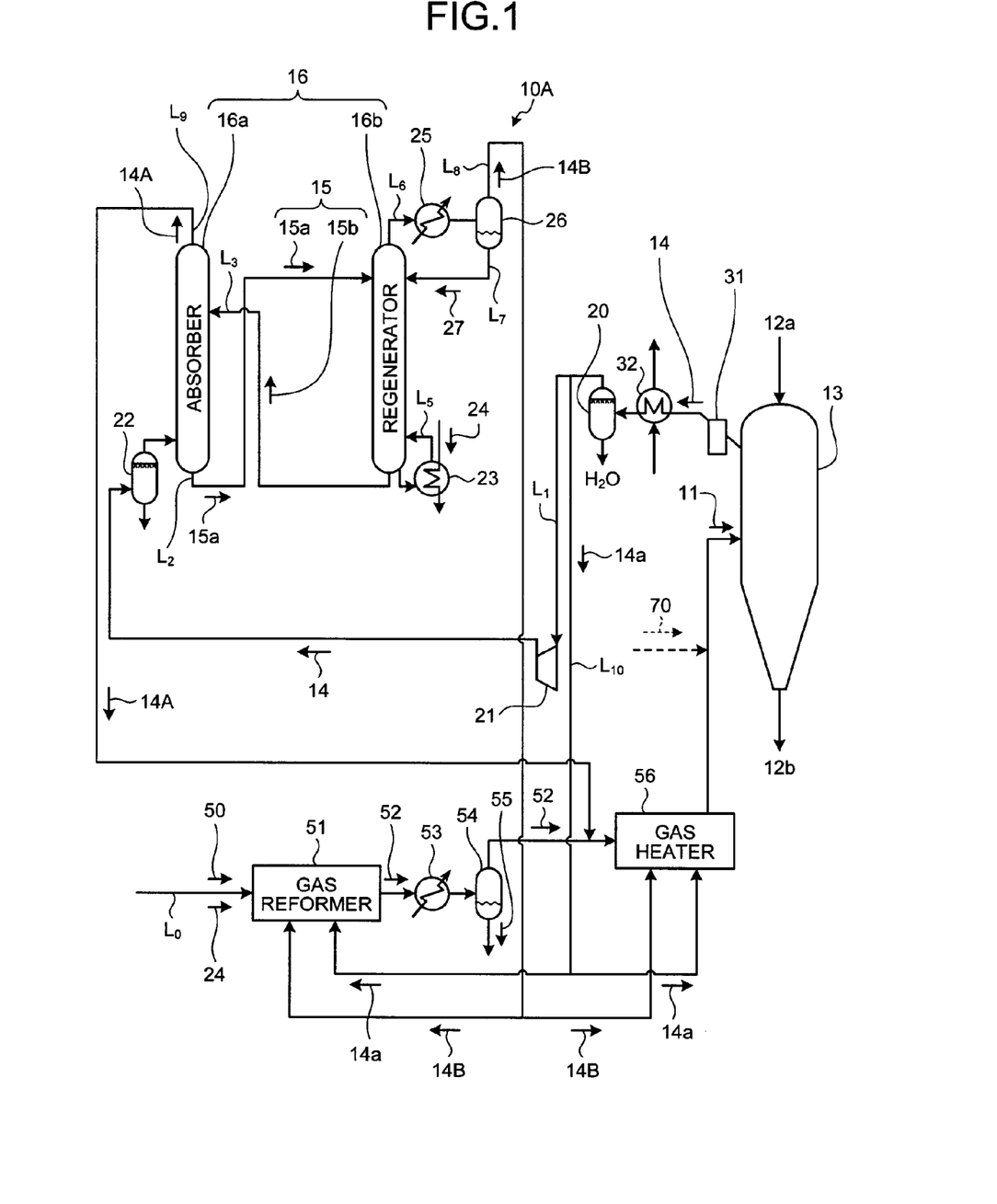
FIG. 1 is a schematic diagram of a direct reduced iron manufacturing system according to a first embodiment.
Figure 2:
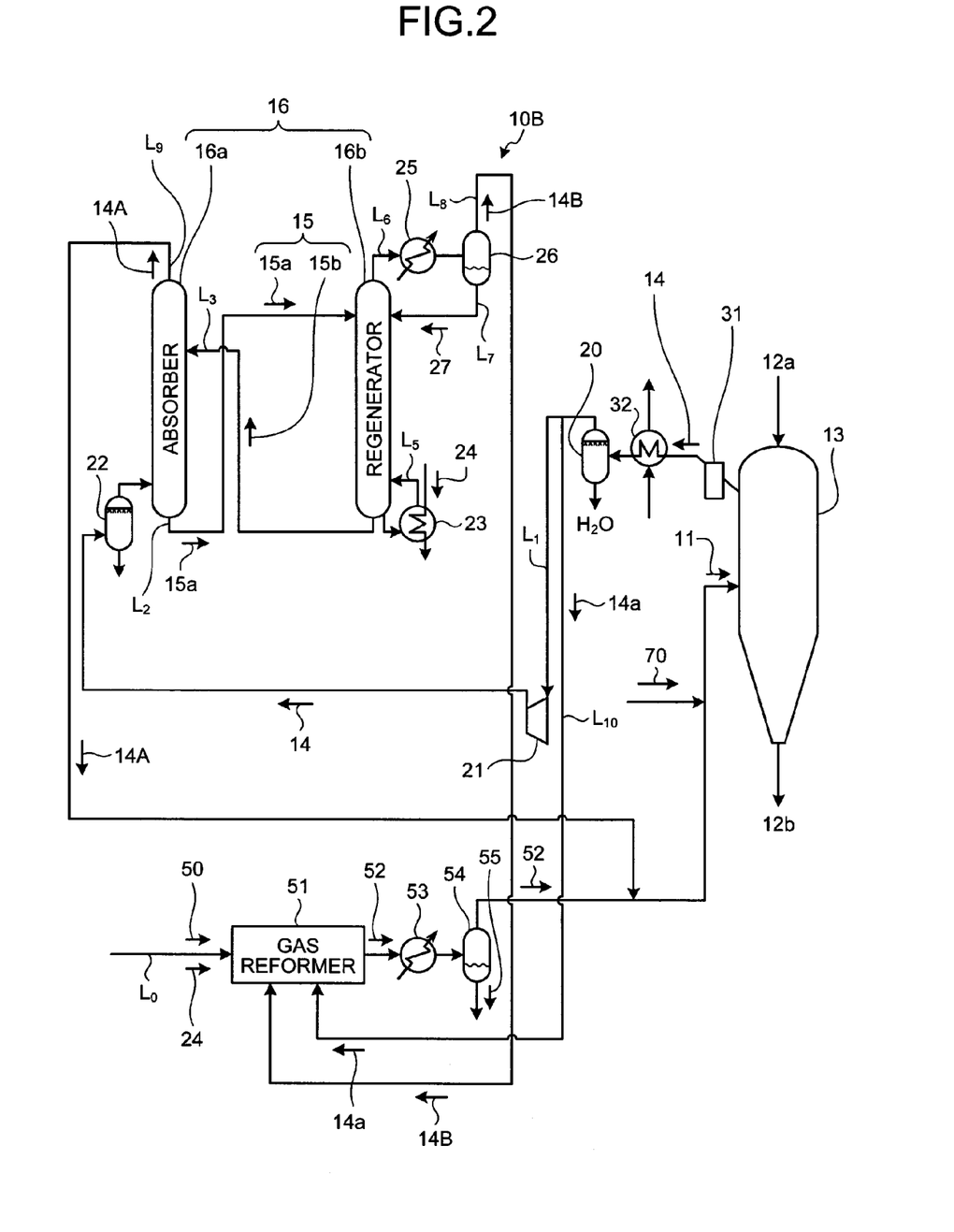
FIG. 2 is a schematic diagram of another direct reduced iron manufacturing system according to the first embodiment.

A direct reduced iron manufacturing system according to an embodiment by the present invention will be described with reference to the drawings. FIG. 1 is a schematic diagram of the direct reduced iron manufacturing system according to a first embodiment. FIG. 2 is a schematic diagram of another direct reduced iron manufacturing system according to the first embodiment. As illustrated in FIG. 1, a direct reduced iron manufacturing system 10A includes a gas reformer (hereinafter referred to as the "reformer") 51 for reforming natural gas, a gas heater 56 being a heating unit for heating a reformed gas 52 reformed in the reformer 51 to a predetermined temperature at which the reformed gas 52 is supplied to a reduction furnace to form a reducing gas, a direct reduction furnace (hereinafter referred to as the "reduction furnace") 13 for reducing iron ore 12a directly into reduced iron 12b using a high-temperature reducing gas 11 including hydrogen ($H_2$) and carbon monoxide (CO), an acid gas removal unit 16 having an acid gas component absorber 16a for removing acid gas components in a reduction furnace flue gas 14 discharged from the reduction furnace 13 with an acid gas absorbent (hereinafter referred to as the "absorbent") 15, and a regenerator 16b for releasing the acid gas, and a recovery gas introduction line $L_8$ for supplying a recovery gas 14B released from the regenerator 16b, the recovery gas 14B including carbon dioxide ($CO_2$) and hydrogen sulfide ($H_2S$), to each of a reforming furnace of the reformer 51 and a furnace of the gas heater 56.

In FIG. 1, a reference numeral 15a denotes a rich solvent, 15b a lean solvent, 20 a scrubber, 21 a compressor, 22 a cooling scrubber, 23 a reboiler, 24 steam, 25 a cooler, 26 a gas-liquid separator, 27 condensed water, $L_1$ a gas supply line for introducing the reduction furnace flue gas 14 into the acid gas removal unit 16, $L_2$ a rich solvent line, $L_3$ a lean solvent line, $L_5$ a reboiler line, $L_6$ a gas release line, $L_7$ a condensed water line, $L_9$ a purified gas discharge line, and $L_{10}$ a reduction furnace flue gas supply line.

The reducing gas 11 is heated up to a predetermined high temperature (for example, 900 to 1,050° C.) by the gas heater 56 when being introduced into the reduction furnace 13.

Moreover, it may be configured on an upstream side of the reduction furnace 13 such that the amount of the reducing gas 11 is increased by a partial oxidation reaction caused by the introduction of a fuel 70 such as oxygen and natural gas.

The iron ore 12a is supplied from a top of the reduction furnace 13 where the reducing gas 11 is introduced, and the supplied iron ore 12a moves toward the furnace's bottom side. At this point in time, the iron ore (iron oxide) 12a is reduced into the reduced iron 12b by hydrogen ($H_2$) and carbon monoxide (CO), which are main components of the reducing gas 11, in countercurrent contact with the high-temperature reducing gas 11 simultaneously supplied from a side of the reduction furnace 13 as well as the hydrogen ($H_2$) and carbon monoxide (CO) are respectively inverted into water ($H_2O$) and carbon dioxide ($CO_2$).

The reduced iron ore is taken out as the reduced iron 12b from a lower side of the reduction furnace 13.

Moreover, the hydrogen ($H_2$) and carbon monoxide (CO) in the reducing gas 11 are not used up in the reduction furnace 13, and the majority of the hydrogen ($H_2$) and carbon monoxide (CO) stays unused and discharged as the reduction furnace flue gas 14 into the gas supply line $L_1$.

The reduction furnace flue gas 14 from the reduction furnace 13 contains dust generated from the reduction furnace 13, such as iron powder, which has an adverse effect on the operation of the acid gas removal unit 16 connected on the downstream side. Therefore, the scrubber 20 removes the dust as well as the water ($H_2O$) produced in the reduction furnace 13.

In the embodiment, a bag filter 31 and a heat exchanger 32 are installed on the gas supply line $L_1$ for supplying the reduction furnace flue gas 14.

The installation of the bag filter 31 promotes the efficiency of removing the dust in the reduction furnace flue gas 14 prior to the process in the scrubber 20. Moreover, the dust in the reduction furnace flue gas 14 supplied to the heat exchanger 32 is removed to promote the maintenance of the heat exchange efficiency of the heat exchanger 32. The bag filter 31 and the heat exchanger 32 are installed when necessary in the direct reduced iron manufacturing system.

The reboiler 23 needs a heat source. However, in the embodiment, it makes it possible to generate the steam 24 by the heat exchanger 32 installed as the heat source on the gas supply line $L_1$ using the heat (gas temperature: approximately 300° C.) of the reduction furnace flue gas 14 and use the generated steam 24.

The reduction furnace flue gas 14 is pressurized by the compressor 21 interposed on the gas supply line $L_1$ and then introduced into the cooling scrubber 22. In the cooling scrubber 22, the gas is decreased in temperature by cooling water, and then introduced into the absorber 16a of the acid gas removal unit 16.

In the absorber 16a, the acid gas of carbon dioxide ($CO_2$) and hydrogen sulfide ($H_2S$) is removed from the reduction furnace flue gas 14 by a chemical absorption reaction of the absorbent 15 to form a purified gas 14A from which the acid gas has been removed, and the purified gas 14A is discharged into the purified gas discharge line $L_9$ from a top side.

The purified gas 14A contains the unused $H_2$ and CO and accordingly if the purified gas 14A, which has been purified in the absorber 16a, joins a natural gas 50 side, the purified gas 14A is supplied through the purified gas discharge line $L_9$ so as to join the reformed gas 52 after the separation of condensed water 55 in a gas-liquid separator 54.

In the absorber 16a of the acid gas removal unit 16, the absorbent 15 absorbs and removes the acid gas components of $CO_2$ and $H_2S$ from among CO, $H_2$, $CO_2$, and $H_2S$ contained in the reduction furnace flue gas 14.

The absorbent 15 that has absorbed $CO_2$ and $H_2S$ in the absorber 16a is referred to as the rich solvent 15a. The rich solvent 15a is supplied to the regenerator 16b side through the rich solvent line $L_2$. The rich solvent 15a introduced into the regenerator 16b releases the absorbed $CO_2$ and $H_2S$ in the regenerator by the heat of the steam superheated in the reboiler 23 to form the lean solvent 15b. The lean solvent 15b is returned again to the absorber 16a through the lean solvent line $L_3$ to be circulated and reused.

A cooling part (not illustrated) for removing the entrained absorbent in the purified gas 14A is provided on an upper side of the absorber 16a.

Moreover, in the regenerator 16b, the recovery gas 14B mainly including the $CO_2$ and $H_2S$ that have been released from the rich solvent 15a is discharged out of the system from its top through the gas release line $L_6$.

The recovery gas 14B is cooled in the cooler 25 interposed on the gas release line $L_6$. The condensed water 27 is then separated from the recovery gas 14B in the gas-liquid separator 26. The separated condensed water 27 is returned into the regenerator 16b through the condensed water line $L_7$.

It is preferred that an amine-based solvent be used as the absorbent that absorbs the acid gas components ($CO_2$, $H_2S$). A known amine-based solvent with, for example, monoethanolamine (MEA), diethanolamine (DEA), or N-methyldiethanolamine (MDEA) as a main agent can be used as the amine-based solvent.

The direct reduced iron manufacturing system 10A of the embodiment illustrates a case of using natural gas as the reducing gas 11.

It is configured such that if gas from the natural gas 50 is reformed to supply the reducing gas 11, the gas reformer 51 for reforming the natural gas 50 is provided, and the steam 24 is supplied to cause a steam reforming reaction, a carbon dioxide reforming reaction, or a reaction of their combination, which leads to the inversion of the natural gas 50 into hydrogen ($H_2$) and carbon monoxide (CO), and the reformed gas 52 mainly including hydrogen ($H_2$) and carbon monoxide (CO) is obtained.

The reformed gas 52, which has been reformed in the reformer 51, is gas-cooled in a gas cooler 53. Afterward, the condensed water 55 is separated from the reformed gas 52 in the gas-liquid separator 54.

The reformed gas 52 from which the water has been separated is introduced into the gas heater 56, heated to a predetermined high temperature (for example, 900 to 1,050° C.), and supplied as the reducing gas 11 into the reduction furnace 13.

Moreover, the recovery gas 14B released from the regenerator 16b mainly includes $CO_2$ and $H_2S$, and is introduced into the reforming furnace of the gas reformer 51 or the furnace of the gas heater 56 by providing the recovery gas introduction line $L_8$.

$H_2S$ is then burned in the furnaces to form sulfur dioxide ($SO_2$), which is diluted by a large amount of combustion gas discharged from the furnaces, and then an appropriate process (for example, a desulfurization process) is performed thereon as flue gasses from the furnaces to be released into the atmosphere.

Consequently, $H_2S$ in the recovery gas 14B to be released from the regenerator 16b is prevented from being discharged directly out of the system. Moreover, if $H_2S$ is treated, for example, with a catalyst and the like, the catalyst used is degraded. Accordingly, it is necessary to replace the catalyst as occasion demands. However, if a combustion process is performed as in the embodiment, the replacement becomes unnecessary, which is economic.

The steam 24 generated by waste heat of the reforming furnace, and the steam 24 generated by heat recovered in the cooler 53 for removing water in the reformed gas 52 emitted from the gas reformer 51 can be used as the steam 24 of the reboiler 23 described above.

Moreover, in order to avoid the accumulation of $CH_4$ and $N_2$ being system inert components in the system, a part 14a of the reduction furnace flue gas emitted from the scrubber 20 is introduced into the reforming furnace of the gas reformer 51 or the furnace of the gas heater 56 through the reduction furnace flue gas supply line $L_{10}$, and the combustion process is performed here on the part 14a.

Moreover, waste heat of the flue gas of the gas reformer 51 or the furnace of the gas heater 56 is fully recovered by heat recovery means such as a heat exchanger, and the flue gas is then discharged. For example, steam is manufactured by the heat recovery means, and can be used in the reboiler 23 and a heat requiring unit in the system, used as the power of the compressor 21 by driving a steam turbine, or used as electric power by generating electric power.

Moreover, it is configured such that if the purified gas 14A, which has been purified in the absorber 16a, joins the natural gas 50 to be reused, the purified gas 14A joins the reformed gas 52 through the purified gas discharge line $L_9$ on an upstream side of the gas heater 56.

Moreover, the gas heater 56 is omitted in a direct reduced iron manufacturing system 10B illustrated in FIG. 2. In this case, it may be configured such that the recovery gas 14B is supplied only to the gas reformer 51 side and the combustion process is performed only by the reforming furnace of the gas reformer 51.

If the gas heater 56 is omitted, it is configured on an upstream side of the reduction furnace 13 such that a partial oxidation reaction is caused on the reformed gas 52 by the introduction of the fuel 70 such as oxygen and natural gas to increase the amount of the reducing gas 11 as well as to internally heat the reducing gas 11 up to the necessary temperature (900 to 1050° C.), and then introduced into the reduction furnace 13.

As described above, the recovery gas 14B released from the regenerator 16b is introduced through the recovery gas introduction line $L_8$ into the reforming furnace of the gas reformer 51 and the furnace of the gas heater 56, or only the reforming furnace and accordingly the combustion process is performed thereon. Thus, the harmful $H_2S$ is prevented from being discharged directly out of the system.

Second Embodiment

Figure 3:
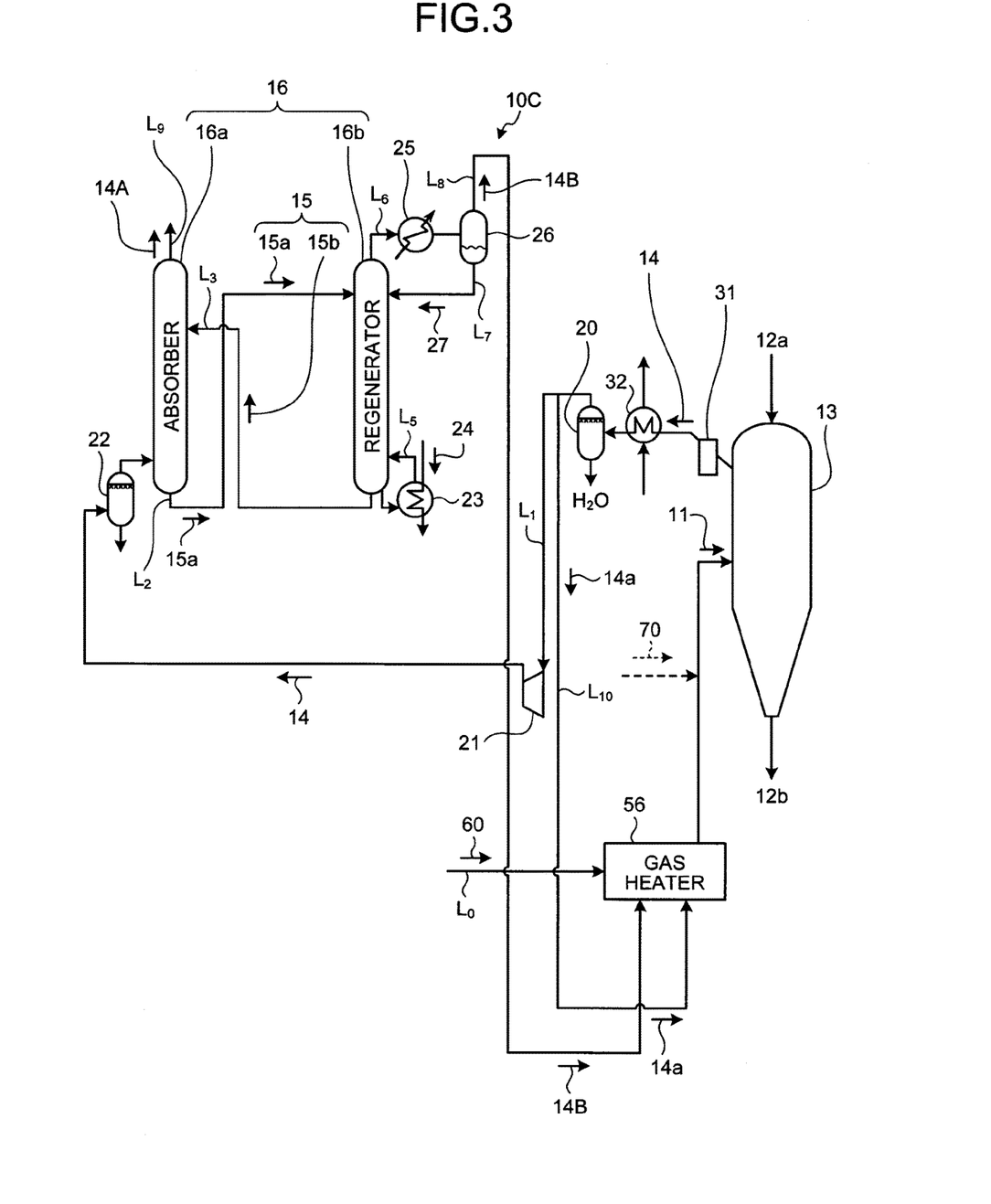
FIG. 3 is a schematic diagram of a direct reduced iron manufacturing system according to a second embodiment.

A direct reduced iron manufacturing system according to an embodiment by the present invention will be described with reference to the drawing. FIG. 3 is a schematic diagram of a direct reduced iron manufacturing system according to a second embodiment. The same reference numerals are assigned to the same configurations as the direct reduced iron manufacturing system 10A according to the first embodiment illustrated in FIG. 1, and their overlapping descriptions will be omitted.

As illustrated in FIG. 3, a direct reduced iron manufacturing system 10C of the embodiment illustrates a case of using coal gasification gas 60 other than natural gas as the reducing gas 11.

In the embodiment, coal is gasified in a gasifier (not illustrated), and purified to obtain the coal gasification gas 60, which is heated by the gas heater 56 to be used as the reducing gas 11.

Moreover, in terms of a gas other than the coal gasification gas 60, it is also possible to use purified coke oven gas as the reducing gas.

If the purified gas 14A joins the coal gasification gas 60 in the direct reduced iron manufacturing system 10C of the second embodiment, the purified gas discharge line $L_9$ can be connected to the gas supply line when necessary. Consequently, the purified gas 14A is caused to join the coal gasification gas 60, is then heated up to a predetermined temperature by the gas heater 56 to form the reducing gas 11, and introduced into the reformer 51.

Moreover, the recovery gas introduction line $L_8$ is provided to introduce the recovery gas 14B released from the regenerator 16b into the furnace of the gas heater 56.

$H_2S$ is then burned in the furnace to form sulfur dioxide ($SO_2$), which is diluted by a large amount of combustion gas discharged from the furnace, and then an appropriate process (for example, a desulfurization process) is performed thereon as flue gasses from the furnaces to be released into the atmosphere.

Third Embodiment

Figure 4:
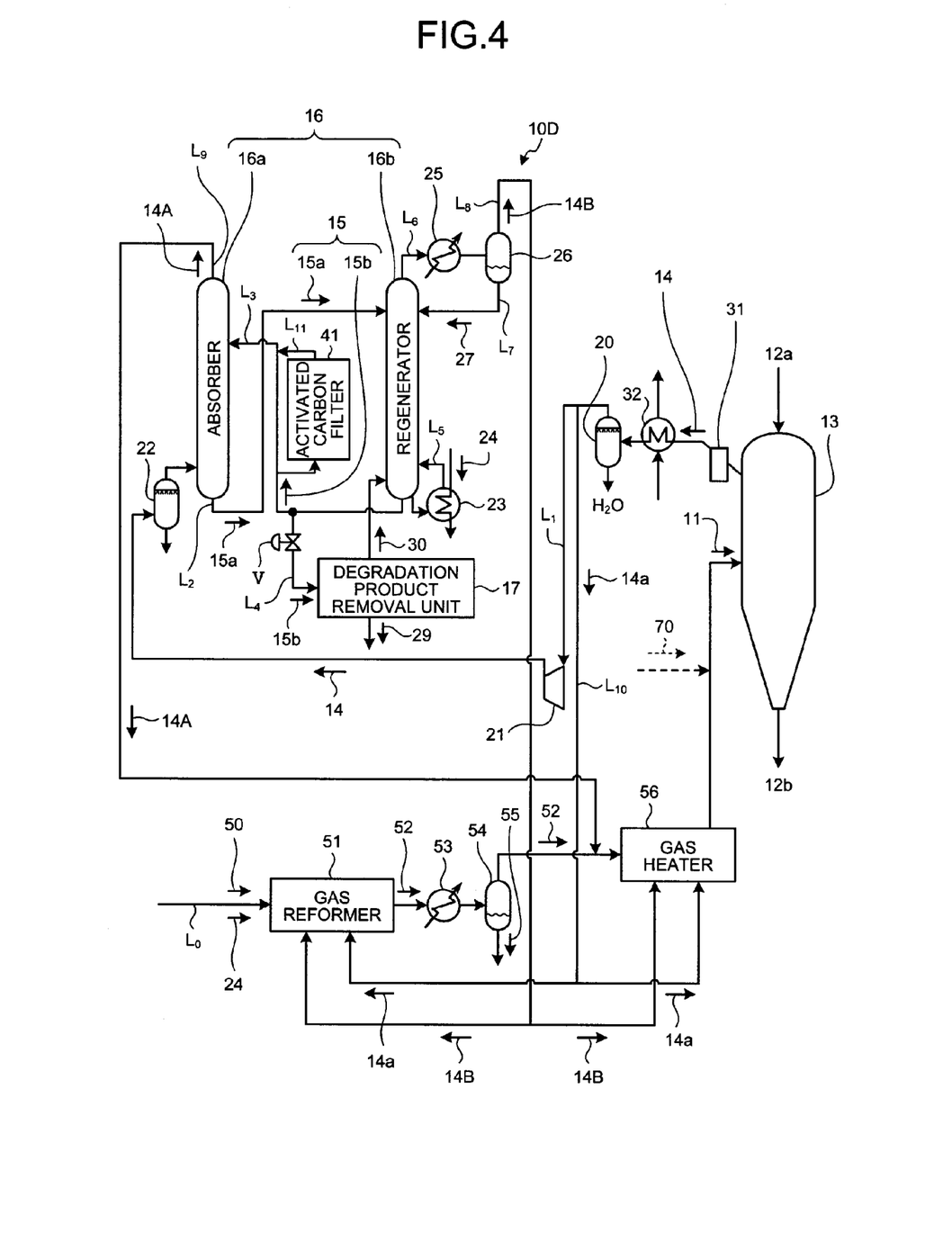
FIG. 4 is a schematic diagram of a direct reduced iron manufacturing system according to a third embodiment.

A direct reduced iron manufacturing system according to an embodiment by the present invention will be described with reference to the drawing. FIG. 4 is a schematic diagram of a direct reduced iron manufacturing system according to a third embodiment. The same reference numerals are assigned to the same configurations as the direct reduced iron manufacturing system 10A according to the first embodiment illustrated in FIG. 1, and their overlapping descriptions will be omitted.

As illustrated in FIG. 4, a direct reduced iron manufacturing system 10D of the embodiment is configured to include, in the direct reduced iron manufacturing system 10A illustrated in FIG. 1, a degradation product removal unit 17 being degradation product removal means for removing a degradation product in the acid gas absorbent 15 reused by circulating through the acid gas removal unit 16, and a filter 41.

The reduction furnace flue gas 14 from the reduction furnace 13 contains a lot of CO and iron components, and those that cannot be removed in the scrubber 20 interposed on the gas supply line $L_1$ may mix in the acid gas removal unit 16.

Moreover, a part of the absorbent 15 causes a chemical reaction with such CO and iron components over long-time operation and accordingly degradation products are produced and processing capacity is reduced.

The degradation product from CO produces formic acid by dissolving CO in the reduction furnace flue gas 14 in the absorbent 15, and the formic acid reacts with the absorbent such as an amine-based solvent to form salts, which are heat stable salts and are accumulated in the absorbent 15.

The heat stable salts are accumulated in the absorbent system to cause, for example, an increase in the boiling point of the absorbent.

If the boiling point is increased, an increase in temperature in the reboiler 23 of the regenerator 16b promotes the thermal degradation of the solvent and reduces the thermal efficiency of the reboiler, which are not preferable.

Moreover, if viscosity is increased, a pressure loss is increased and foaming occurs, which are not preferable.

Moreover, the degradation product from iron is produced by the degradation of the absorbent. For example, if an amine-based solvent is used as the absorbent, its degradation leads to the production of glycines such as bicine (N,N-Bis (2-hydroxyethyl)glycine). Such glycines form iron and a chelate complex to prevent film formation on an iron surface while involving a trivelent iron complex in a reduction-oxidation reaction to encourage the dissolution of iron and promote corrosion in an accelerative manner, which are not preferable.

Especially, dust from the iron ore, which flows from the reduction furnace 13, has a large specific surface area. Accordingly, a sudden formation of an iron complex is expected.

Moreover, the absorbent 15 itself is also decomposed by being heated in the reboiler to produce degradation components. Accordingly, the absorption capacity of the acid gas is reduced.

The absorbent 15 is circulated/reused as the rich solvent 15a and the lean solvent 15b. Accordingly, the above degradation products are accumulated in the absorbent 15, which causes a reduction in processing capacity and corrosion of equipment.

Hence, the present invention is configured so as to provide a lean solvent branch line $L_4$ that branches from the lean solvent line $L_3$ for returning the absorbent from the regenerator 16b to the absorber 16a, provide the degradation product removal unit 17 to the lean solvent branch line $L_4$, separate/remove the degradation products, and regenerate the absorbent. The lean solvent 15b to be supplied to the lean solvent branch line $L_4$ is controlled as necessary by opening/closing a valve V interposed on the lean solvent branch line $L_4$.

The degradation product removal unit 17 is provided to reduce the concentration of the degradation products accumulated in the absorbent 15, recover or maintain the performance of the absorbent 15, and maintain and control the performance of the absorbent 15 over a long period of time.

For the degradation product removal unit 17, there are an absorbent regeneration method by distillation using a difference in boiling point between the absorbent 15 used and the degradation products, a method for concentrating and separating the degradation products by electrodialysis, a method for separating the degradation products by ion exchange, and their combination.

A reclaimer of the absorbent regeneration method includes, for example, a heat exchanger reclaimer.

If the degradation products are to be removed, when one or both of the degradation products from CO and the degradation products from Fe exceed their reference values, the valve V is opened to supply a part of the lean solvent 15b to the degradation product removal unit 17, and start the operation of removing the degradation products.

When the concentration of the degradation products in the lean solvent 15b is reduced below a predetermined value, the operation of removing the degradation products is stopped.

It may be configured such that the operation can be performed when the degradation products from CO (the concentration of the heat stable salt) exceed a degradation product removal start reference value, for example, two wt %.

Moreover, it can be configured such that the operation can be performed when the degradation products from Fe (for example, glycines such as bicine) exceed a degradation product removal start reference value, for example, five ppm.

It can be configured to start the degradation product removal operation when either of the degradation products from CO (the concentration of the heat stable salt) and the degradation products from Fe (glycines such as bicine) reaches its reference value if both of the values of the degradation products are measured.

The concentrations of the degradation products are examples, and are changed as appropriate according to the kind of the absorbent such as an amine-based solvent, and conditions in the acid gas removal unit.

A sudden increase in iron concentration is expected. Accordingly, it is necessary to perform concentration monitoring separately and frequently.

The degradation products may be monitored by an automatic or manual analysis operation and determined by unillustrated determination means.

Solvents based on amines with low boiling points such as 1DMA2P (1-dimethylamino-2-propanol: boiling point 124° C.), DMAE (N,N-dimethylaminoethanol; boiling point 134° C.), MPZ (1-methylpiperazine: boiling point 138° C.), PZ (piperazine: boiling point 146° C.), 2MPZ (2-methylpiperazine: boiling point 155° C.), DEAE (N,N-diethyl-2-aminoethanol: boiling point 161° C.), AMP (2-amino-2-methyl-1-propanol: boiling point 166° C.), EAE (2-ethylaminoethanol: boiling point 170° C.), methylethylamine (MEA: boiling point 170° C.), nBAE (2-butylaminoethanol: boiling point 200° C.), and 4AMPR (4-piperidinemethaneamine: boiling point 200° C.) are used as the absorbent that absorbs the acid gas components ($CO_2$, $H_2S$) to facilitate, for example, the evaporation and separation of the degradation products.

This is because even if it is an amine-based solvent, if a solvent based on an amine with a high boiling point (247° C.) such as MDEA (N-methyldiethanolamine) is used, the degradation products cannot be evaporated and separated by evaporation using steam and recycling is not efficient.

A degraded concentrate 29 concentrated in the degradation product removal unit 17 is discharged out of the system.

A stripped gas 30 of the absorbent is returned to a lower side of the regenerator 16b.

As described above, according to the embodiment, the degradation product removal unit 17 can separate the degradation products in the absorbent 15 that circulates through the absorber 16a and the regenerator 16b and accordingly the need of frequent replacement of the absorbent 15 is eliminated, which enables the promotion of a dramatic reduction in the amount of use of the solvent compared with before.

Moreover, the concentration of the solvent degradation products is continuously controlled. Accordingly, it is possible to suppress the occurrence of foaming, achieve stable operation, and also suppress corrosion of equipment.

The stabilization of the operation makes it possible to achieve the safe operation of the entire direct reduced iron process, and a reduction in cost by a reduction in the consumption amount of the solvent.

The degradation product removal unit 17 needs a heat source. However, in the embodiment, it makes it possible to generate the steam 24 by the heat exchanger 32 installed as the heat source on the gas supply line $L_1$ using the heat (gas temperature: approximately 300° C.) of the reduction furnace flue gas 14 and use the generated steam 24.

Moreover, the direct reduced iron manufacturing system 10D of the embodiment includes a lean solvent bypass line $L_{11}$ that bypasses a part of the lean solvent 15b to be introduced into the absorber 16a from the regenerator 16b, and the filter 41 interposed on the lean solvent bypass line $L_{11}$.

The filter 41 is installed in the system to further remove degradation products, impurities, and the like that cannot be removed in the degradation product removal unit 17, which enables long-term maintenance of the performance of the absorbent 15 such as an amine-based solvent.

The components that cannot be removed in the degradation product removal unit 17 include a volatile degradation factor substance with a boiling point lower than the absorbent such as an amine-based solvent.

In the embodiment, an activated carbon filter is used as the filter 41. However, as long as the filter can remove impurities, the filter is not limited to the activated carbon filter.

The amount of the lean solvent 15b to be bypassed to the lean solvent bypass line $L_{11}$ is set to approximately one-tenth of the total amount. However, it may be adjusted as appropriate depending on the concentration of impurities.

REFERENCE SIGNS LIST 10A to 10D DIRECT REDUCED IRON MANUFACTURING SYSTEM
11 HIGH-TEMPERATURE REDUCING GAS
12a IRON ORE
12b REDUCED IRON
13 DIRECT REDUCTION FURNACE
14 REDUCTION FURNACE FLUE GAS
15 ACID GAS ABSORBENT (ABOSORBENT)
16 ACID GAS REMOVAL UNIT
16a ACID GAS COMPONENT ABSORBER (ABSORBER)
16b REGENERATOR

The invention claimed is:

1. A direct reduced iron manufacturing system comprising:
   a gas reformer for reforming natural gas;
   a heating unit for heating a reformed gas reformed by the gas reformer to a predetermined temperature at which the reformed gas is supplied to a reduction furnace to form a reducing gas;
   a direct reduction furnace for reducing iron ore directly into reduced iron using a high-temperature reducing gas comprising hydrogen and carbon monoxide;
   an acid gas removal unit including
      an acid gas component absorber for removing, with an acid gas absorbent, an acid gas component in a reduction furnace flue gas discharged from the direct reduction furnace, and
      a regenerator for releasing the acid gas component as a recovery gas; and
   a recovery gas introduction line for supplying the recovery gas released from the regenerator, the recovery gas comprising carbon dioxide and hydrogen sulfide, to a reforming furnace of the gas reformer and a furnace of the heating unit, or only the reforming furnace, wherein
   the acid gas component absorber includes a first outlet for releasing purified gas comprising $H_2$ and CO, and a second outlet for releasing the rich solvent comprising absorbent which has absorbed $CO_2$ and $H_2S$ in the acid gas component absorber, and
   the regenerator includes a first outlet for releasing the recovery gas to the recovery gas introduction line, a second outlet for supplying a lean solvent to the acid gas component absorber, and an inlet for receiving a rich solvent from the acid gas component absorber.

2. The direct reduced iron manufacturing system according to claim 1, further comprising a degradation product removal unit for separating and removing a degradation product in the acid gas absorbent.

3. The direct reduced iron manufacturing system according to claim 1, further comprising:
   a bypass circuit for bypassing a part of a lean solvent to be returned from the regenerator to the absorber; and
   a filter interposed in the bypass circuit.

4. The direct reduced iron manufacturing system according to claim 1, further comprising:
   an introduction line for introducing the reduction furnace flue gas into the acid gas removal unit;
   a heat exchanger, interposed on the introduction line, for heat exchanging the reduction furnace flue gas;
   a bag filter provided upstream of the heat exchanger; and
   a scrubber provided downstream of the heat exchanger.

5. A direct reduced iron manufacturing system comprising:

a heating unit for heating coal gasification gas or coke oven gas to a predetermined temperature at which the coal gasification gas or the coke oven gas is supplied to a reduction furnace to form a reducing gas;

a direct reduction furnace for reducing iron ore directly into reduced iron using a high-temperature reducing gas comprising hydrogen and carbon monoxide;

an acid gas removal unit including
    an acid gas component absorber for removing, with an acid gas absorbent, an acid gas component in a reduction furnace flue gas discharged from the direct reduction furnace, and
    a regenerator for releasing the acid gas component as a recovery gas; and a recovery gas introduction line for supplying the recovery gas released from the regenerator, the recovery gas comprising carbon dioxide and hydrogen sulfide to the furnace of the heating unit, wherein the acid gas component absorber includes a first outlet for releasing purified gas comprising $H_2$ and CO, and a second outlet for releasing rich solvent comprising absorbent which has absorbed $CO_2$ and $H_2S$ in the acid gas component absorber, and the regenerator includes a first outlet for releasing the recovery gas to the recovery gas introduction line, a second outlet for supplying a lean solvent to the acid gas component absorber, and an inlet for receiving a rich solvent from the acid gas component absorber.

6. The direct reduced iron manufacturing system according to claim 5, further comprising a degradation product removal unit for separating and removing a degradation product in the acid gas absorbent.

7. The direct reduced iron manufacturing system according to claim 5, further comprising:
    a bypass circuit for bypassing a part of a lean solvent to be returned from the regenerator to the absorber; and
    a filter interposed in the bypass circuit.

8. The direct reduced iron manufacturing system according to claim 5, further comprising:
    an introduction line for introducing the reduction furnace flue gas into the acid gas removal unit;
    a heat exchanger, interposed on the introduction line, for heat exchanging the reduction furnace flue gas;
    a bag filter provided upstream of the heat exchanger; and
    a scrubber provided downstream of the heat exchanger.

* * * * *